Figure 1:
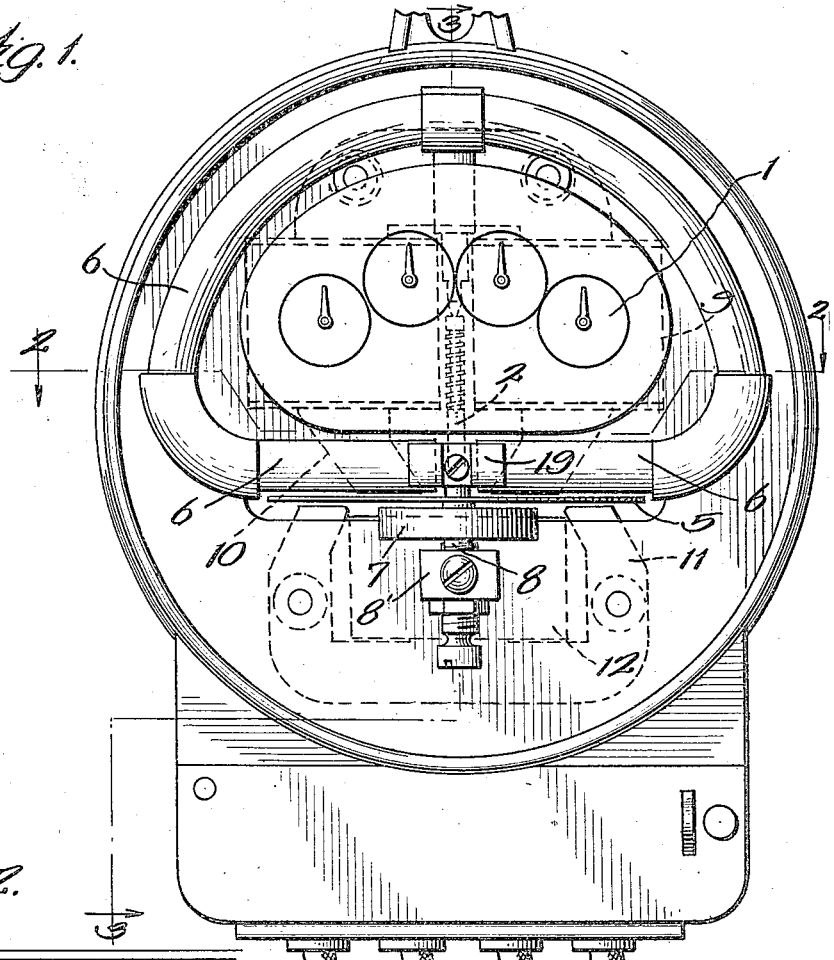

Nov. 20, 1928.  
J. HARRIS  
ELECTRICITY METER  
Filed Dec. 27, 1926

1,692,656

2 Sheets-Sheet 1

Inventor:
Jesse Harris

Nov. 20, 1928.
J. HARRIS
ELECTRICITY METER
Filed Dec. 27, 1926

1,692,656

2 Sheets-Sheet 2

Inventor:
Jesse Harris

Patented Nov. 20, 1928.

1,692,656

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

ELECTRICITY METER.

Application filed December 27, 1926. Serial No. 157,223

My invention relates to electricity meters and particularly to watt meters which employ motor elements and motion damping magnets that operate in conjunction with motion damping armatures upon the moving elements of the meters, though the invention is not to be thus restricted.

The invention resides in means for offsetting or compensating for the effects arising in these magnetic motion damping devices due to changes in temperature. In meters as at present constructed the braking action of the damping magnets is weakened as the temperature rises, permitting the meter to operate more rapidly per unit of load or energy. Conversely, the braking action of the damping magnet is increased as the temperature is lowered causing the meter to operate more slowly per unit of load or energy. Hitherto watt meters have been calibrated to operate as perfectly as possible at a normal or mean temperature but error was introduced by a change in tempearture with the result that either the customer would be charged too much for current if the temperature were increased from the selected mean or too little if the temperature were decreased from the selected mean.

I employ a thermo-motive device inclusive of magnetic material serving to vary the flux passing from the magnet to the armature and also inclusive of material responsive to temperature changes, said thermo-motive device having facility for opposing its movement, and means supplied to the thermo-motive device for modifying such opposition to its movement upon a change in its position.

In the preferred embodiment of the invention a diverter in the form of a block of iron or other magnetic material is carried upon one end of a thermostatic member formed of a strip of Invar metal and a strip of brass, the other end of this member being mounted upon a suitable support on which it may swing. The thermostatic member is thus resilient and serves as a lever, being fulcrumed upon its mounting, for defining the flux controlling position of the block. An abutment is provided between said fulcrum and the block of magnetic material to change the effective length of the lever and thereby change the opposition to the movement of the block when the block is brought to a changed position, said abutment then functioning as a fulcrum in place of the main fulcrum of such thermostatic lever. The construction is such, in other words, that the fulcrum of the thermostatic lever is shifted as the position of the flux diverting body is altered, for the purpose stated. In the preferred embodiment of the invention, said abutment has a curved engaging face whereby the fulcrum is gradually shifted and the opposition to the movement of the block is gradually changed as the position of the block is gradually changed.

Figure 2:
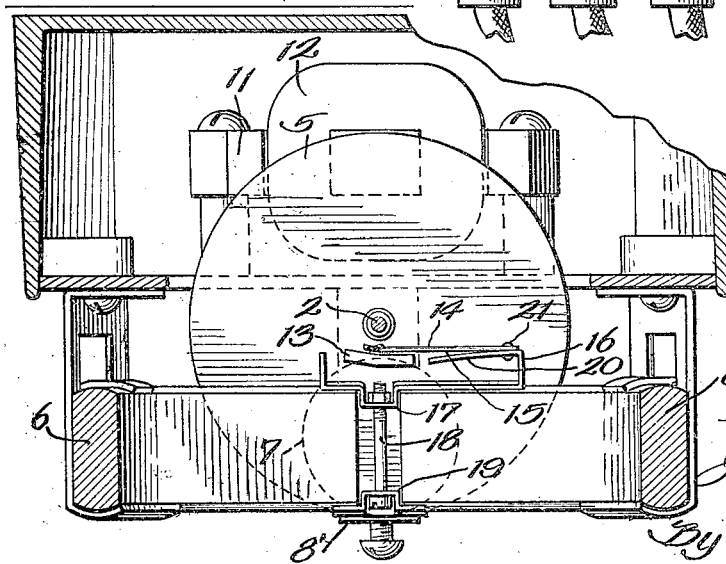
Figure 3:
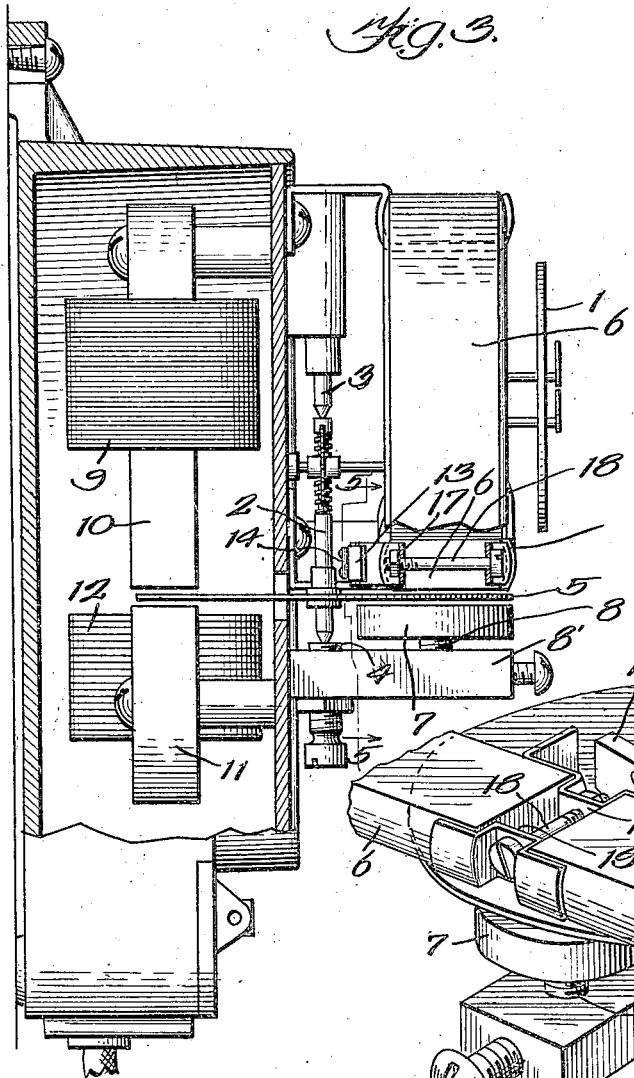
Figure 4:
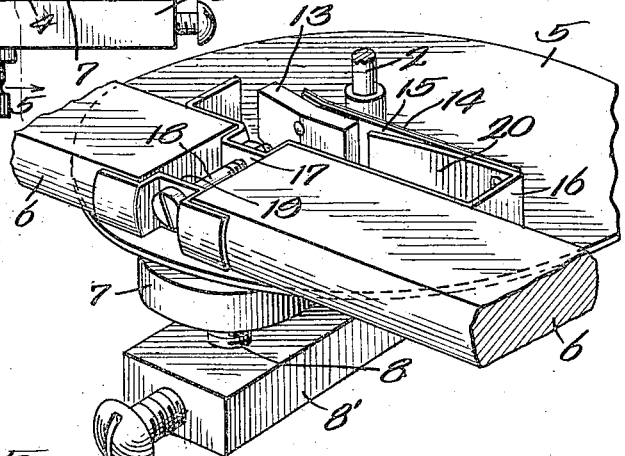
Figure 5:
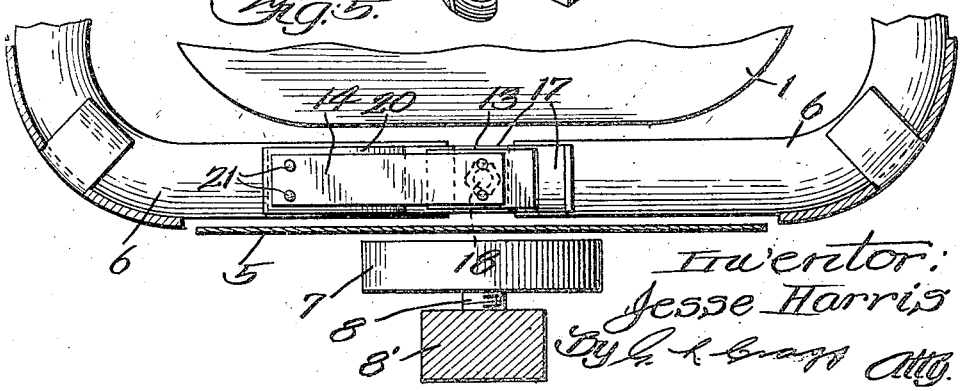

I will explain my invention more fully by reference to the accompanying drawings in which Fig. 1 is a front elevation of a single phase alternating current induction electricity or watt hour meter, parts unessential to an understanding of the invention being omitted; Fig. 2 is a sectional view on line 2—2 of Fig. 1, parts being broken away; Fig. 3 is a sectional view on line 3—3 of Fig. 1; Fig. 4 is a perspective view illustrating the device of my invention; and Fig. 5 is a sectional view on line 5—5 of Fig. 3, on a larger scale.

The meter illustrated is a single phase alternating current electricity or watt hour meter but it is obvious that the invention may be also used in connection with direct current meters and may be applied to watt meters of the indicating and recording type.

The meter illustrated includes any suitable indicating or revolution counting mechanism 1 which is operated by the upright meter shaft or spindle 2 suitable supported at its ends in bearings 3, 4. Said spindle carries an armature in the form of a disc 5 of aluminum or other suitable non-magnetic metal. This disc may serve as an armature to constitute a part of the motive element of the meter and also preferably serves as an element of a damping device which turns in a magnetic field furnished by a damping permanent magnet 6. The damping magnet shown is disposed with its poles upon the top side of the disc armature. An iron keeper 7 is disposed on the other side of the disc armature and opposite the magnetic poles, this disc being traversed by the flux passing between the poles of the magnet and serving to define a path for this flux which traverses the disc transversely thereto. The keeper 7 is upon a rod 8 threaded into a support 8' whereby it may be moved toward and from the disc in calibrating. The armature 5 is preferably also the armature of the motor member of the meter, being subject to magnetic flux from the potential winding 9 passing therethrough from the poles of the U-shaped magnet core 10 that is perpendicular to and on one side of the armature disc 5. An E-shaped core 11 is perpendicular to and upon the other side of the armature disc. The middle leg of core 11 is wound with a current winding or coil 12 included in a main of the system and cooperating with the meter armature and the potential element to produce torque proportional to the wattage.

The magnetic flux diverter illustrated includes a thermostatic or thermo-motive member comprising a magnetic iron block 13, and a thermostatic member comprising strips of dissimilar metal 14 and 15, Invar and brass being suitable metals out of which to form the thermostatic member. The block 13 is carried at one end of the thermostatic member 14, 15, in a position to span the gap between the poles of the permanent damping magnet 6, the thermostatic member being mechanically assembled with the damping magnet as by means of the support 16 which is preferably formed of strip brass and has a portion 17 entering the space between the poles of the damping permanent magnet. A bolt 18 passes through the support portion 17 and through a positioner 19 on the other side of the permanent magnet and which also has a portion entering the space between the magnet poles. When this bolt is clamped, the support 16 is firmly positioned against one side of the permanent magnet. The thermostatic member 14, 15 will flex in response to changes in temperature to bring the flux diverter 13 closer to or away from the poles to correspondingly vary the flux to compensate for variations in temperature. In order that the movement of the flux diverter may be accurately related to the flux that is to be diverted in correspondence with the changes in temperature to accurately compensate for such changes, the support 16 has a continuation 20 which is curved to form a curved abutment upon which the thermostatic member turns as it is flexed. The place 21 of attachment of the thermostatic member to the support 16 constitutes the main fulcrum of this thermostatic member. The part 20 constitutes a supplemental fulcrum, or, rather, a loci for a plurality of fulcra which is provided for the thermostatic member as the flux diverter is moved toward and away from the magnet poles. The part 20, thus constituting a fulcrum abutment, preferably functions to gradually change the opposition to the movement of the flux diverter that is afforded by the resilience of the thermostatic member and while I prefer the gradual shifting of the fulcrum of the thermostatic member specified, I do not wish to be limited thereto.

In the embodiment of the invention illustrated, the flux diverter 13 is moved toward the magnet as the temperature is lowered to shunt more damping flux from the damping disc 5 to compensate for the effect of decreased temperature. This diverter is is moved away from the damping magnet as the temperature rises to permit an increase of damping flux through the damping disc to compensate for effects due to rise in temperature. It will be observed that the damping magnet exerts attractive effort upon the flux diverter member 13 of the thermo-motive device and upon the thermostatic strip of the thermo-motive member 14, 15 by way of said diverter. The position of the flux diverter is thus jointly determined by the attractive effort of the magnet operating upon the diverter and by the temperature operating upon the thermostatic member 14, 15.

Changes may be made without departing from the invention.

Having thus described my invention, I claim:—

1. An electricity meter inclusive of a motor having a motion damping armature upon its moving element; a motion damping magnet furnishing a magnetic field in which said armature turns; a block of magnetic material disposed in the polar region of said magnet to alter the strength of the aforesaid magnetic field in which said armature turns; a mounting strip carrying said block at one end and having a mounting to which it is secured at its other end, said strip being formed to flex in response to change in temperature whereby the proximity of said block to said magnet is varied to vary the effect of said block upon the aforesaid magnetic field; and a fulcrum located between the mounted end of said strip and said block and positioned to enable said strip to become engaged therewith or separated therefrom in response to changes in temperature to vary the effective length of said strip and its consequent influence upon the position of said block.

2. The structure of claim 1 in which the poles of the damping magnet are upon the same side of the armature.

3. The structure of claim 1 wherein a plurality of fulcra are provided between the mounted end of the flexible strip and the block of magnetic material and arranged to be successively engageable by the strip when the strip is flexed in one direction and from which the strip is successively separated in reversed order when the strip is flexed in a reverse direction.

4. An electricity meter inclusive of a motor having a motion damping armature upon its moving element; a motion damping magnet furnishing a magnet field in which said armature turns, the poles of the magnet being upon the same side of the armature; a block of magnetic material disposed in the polar region of said magnet to alter the strength of the aforesaid magnetic field in which said armature turns; a mounting strip carrying said block at one end and having a mounting to which it is secured at its other end, said strip being formed to flex in response to change in temperature whereby the proximity of said block to said magnet is varied to vary the effect of said block upon the aforesaid magnetic field; and a plurality of fulcra located between the mounted end of said strip and said block and positioned to enable said strip to become successively engaged therewith or separated therefrom in response to changes in temperature to vary the effective length of said strip and its consequent influence upon the position of said block.

In witness whereof, I hereunto subscribe my name.

JESSE HARRIS.